United States Patent
Hiestand

[15] 3,644,253

[45] Feb. 22, 1972

[54] AQUEOUS EMULSIONS

[72] Inventor: Armin Hiestand, Binningen, Switzerland

[73] Assignee: Ciba Limited, Basel, Switzerland

[22] Filed: Apr. 1, 1970

[21] Appl. No.: 24,870

[30] Foreign Application Priority Data

Apr. 9, 1969 Switzerland ..................5451/69

[52] U.S. Cl. ..........................260/28, 117/135.5
[51] Int. Cl. ..........................C08g 51/52
[58] Field of Search ..........260/28; 106/2; 117/135.5

[56] References Cited

UNITED STATES PATENTS

| | | | |
|---|---|---|---|
| 2,835,639 | 5/1958 | Widmer | 260/28 |
| 2,835,641 | 5/1958 | Widmer | 260/28 |
| 2,927,090 | 3/1960 | Hiestand | 260/28 |
| 3,057,675 | 10/1962 | Hiestand | 117/135.5 |

*Primary Examiner*—Morris Liebman
*Assistant Examiner*—P. R. Michl
*Attorney*—Harry Goldsmith, Joseph G. Kolodny and Mario A. Monaco

[57] ABSTRACT

Aqueous emulsions are provided, which are used for the preparation of baths serving to produce wash-fast water-repellent finishes on fiber materials. These emulsions contain relative to the dry weight of the components (a) 9 to 54 percent of a methylolaminotriazone etherified with higher fatty alcohols, (b) 4.5 to 48 percent of a waxy substance and (c) 40 to 55 percent of a reaction product of an aminoplast precondensate, a monohydroxy compound, a polyethylene glycol and an oxygen-containing aliphatic or heterocyclic amine. The solids content of these emulsions is 10 to 50 percent by weight. For use these emulsions are diluted with water, and a curing catalyst is added.

8 Claims, No Drawings

AQUEOUS EMULSIONS

The subject of the invention are aqueous emulsions with a total solids content of 10 to 50 percent by weight, characterized in that they contain the following relative to the dry weight of the components (a), (b) and (c): (a) 9 to 54 percent of a methylolaminotriazine etherified with higher fatty alcohols, (b) 4.5 to 48 percent of a hydrophobic, waxy, substance soluble in the component (a), and (c) 40 to 55 percent of a reaction product of (c.1) at least one aminoplast precondensate containing methylol groups or its ether with an alkanol with at most three carbon atoms, (c.2) at least one monohydroxy compound containing at least four carbon atoms, (c.3) at least one polyethylene glycol and (c.4) at least one oxygen-containing aliphatic or heterocyclic amine.

Derivatives of formoguanamine, acetoguanamine or benzoguanamine, but preferably of melamine, are for example used as component (a). Methylol groups of these compounds are etherified with higher fatty alcohols, that is to say fatty alcohols containing at least 14 carbon atoms. In addition to the methylol groups modified in this way, these compounds advantageously further contain methylol groups etherified with alkanols containing at most four carbon atoms, such as methanol, isopropanol or especially butanol. As a rule it is advisable for the methylol groups present to be etherified to the extent of at least 75 percent, and preferably to the extent of 16 to 50 percent with higher fatty alcohols.

As examples of a higher alcohol with 14 to 24 carbon atoms, myristyl, palmityl, stearyl, arachyl, behenyl or lignoceryl alcohol may be mentioned; the radicals do not all have to be the same and higher molecular technical fatty alcohols can therefore be used with advantage.

The ethers obtained from methylomelamine-ether and stearyl, arachyl or behenyl alcohol are particularly suitable.

The molecular chain of the higher alcohol can optionally also be interrupted by nitrogen atoms, that is to say instead of the actual alcohols it is for example also possible to use fatty acid methylolamides as etherifying agents in the manufacture of the component (a). Possible fatty acids are here above all those with 12 to 24 carbon atoms, for example lauric, myristic, palmitic or stearic acid. Such a methylolamide is, for example, stearic acid methylolamide.

As component (b), it is possible to use known waxy substances, such as for example beeswax, polyethylene and especially paraffins, of which the melting points are advantageously between 45° and 70° C. Polyethylenes appropriately have a molecular weight between 1,000 and 3,000. By a waxy substance there is as a rule understood a hydrophobic fusible substance which is plastically deformable and possesses a smooth surface which can be scratched.

In manufacturing the reaction products (= component c) an appropriate procedure is first to etherify the component (c.1) with the components (c.2) and (c.3) and thereafter to react the product with the product with component (c.4). In general it is advisable, when manufacturing the ethers, first to etherify the component (c.1) with the component (c.2) and then with the component (c.3) and thereafter to react the product with the component (c.4).

By aminoplast precondensates, addition products of formaldehyde to nitrogen compounds which can be methylolated are understood. Poly-amino-triazines, such as N-substituted melamines, for example N-butylmelamine, as well as guanamines, for example benzoguanamine and acetoguanamine, monoalkylureas and monoarylureas and glycolurils, for example acetylenediurea, may be mentioned.

Further possibilities are also derivatives of alkyleneureas, for example the 4,5-dihydroxy-imidazolidone-2 which is substituted in the 4-position, at the hydroxyl group, by the radical —$CH_2CH_2CO-NH-CH_2$—OH. The methylol compounds of urea and of melamine are preferably used. Particularly valuable products are provided by products which are as highly methylolated as possible. Suitable starting products are both the predominantly monomolecular aminoplast compounds and also more highly precondensed aminoplast compounds.

The ethers of these aminoplast compounds are ethers of low-molecular alkanols such as for example methanol, ethanol, n-propanol or isopropanol.

Hydrophobic radicals are introduced into the component (c.1) by etherifying the methylol groups of the aminoplast precondensate (c.1) with monohydroxy compounds (c.2) which contain at least four carbon atoms. If alkyl-ether groups with one to three carbon atoms are already present in the component (c.1), the hydrophobic radicals of the component (c.2) are introduced by transetherification. Alkanols with four to 18 carbon atoms are especially used as the component (c.2). Interesting products are above all obtained if n-butanol, and optionally, in order to intensify the hydrophobic character, additionally also a higher alkanol, are used as component (c.2). Possible higher alkanols which contain at least four carbon atoms are for example octanol, dodecanol, octadecyl alcohol or mixtures of such alcohols.

Further possible components (c.2) are benzyl alcohol, hydroxybenzenes and hydroxynaphthalenes, but especially also the known hydroxyalkylbenzenes, such as 1-hydroxy-4-nonyl- or -tertiary butylbenzene, and also alicyclic monohydroxy compounds such as hydroabietyl alcohol. The molecular chain of the hydroxyl compound can optionally also be interrupted by heteroatoms, as is for example the case with stearic acid methylolamide.

The manufacture of the etherification product of the aminoplast precondensate (c.1), preferably of a ureaformaldehyde or melamine-formaldehyde compound, with the hydrophobic hydroxy compound (c.2) is best effected, for example when using n-butanol, directly with an excess of this alcohol, with a weakly acid reaction being maintained and with the water present or the water produced during the etherification being distilled off azeotropically. The introduction of components of more strongly hydrophobic character such as for example n-dodecanol or alkylphenol is preferably effected by replacing the butanol radicals in the butyl ethers. The latter are easily accessible in a more or less high molecular form as so-called lacquer resins.

The radicals of the polyethylene glycol (= component c.3) can also be introduced by transetherification and here, as in the case of the monohydroxy compounds, the butyl ethers, but also the methyl or ethyl ethers, of the methylol compounds can be used as the starting product.

Possible polyethylene glycols are primarily those with a mean molecular weight of 600 to 20,000, preferably 1,000 to 5,000.

These polyethylene glycols are hydrophilic compounds and can be introduced into the molecule before the monohydroxy compounds, simultaneously with them or after them. Their total amount is so chosen that the resulting mixed ethers, while becoming hydrophilic, do not become water soluble. For this purpose, the hydrophilic component should amount to at least about 10 percent and at most about 45 percent of the total condensation product, that is to say the quantity ratio of the polyethylene glycol condensed into the aminoplast to the remaining part of the condensation product should be at least 1:9 and at most 9:11.

The mixed ethers manufactured in this manner are now reacted with the component (c.4).

As component (c.4), alkanolamines or heterocyclic amines containing six ring members and containing an oxygen atom and at least one basic nitrogen atom in the ring, are preferably used. Alkanolamines which are very suitable are, for example ethanolamines and propanolamines, such as mono-, di- and triethanolamine, mono-, di- and triisopropanolamine, methylethanolamine, dimethylethanolamine and diethylethanolamine. As a heterocyclic amine, morpholine and ethanol-morpholine may especially be mentioned.

Preferred reaction products (= component c) consist of (c.1) at least one methylolurea or methylolmelamine, (c.2) at least one alkanol with four to 18 carbon atoms, (c.3) at least one polyethylene glycol with an average molecular weight of 1,000 to 5,000, and (c.4) at least one alkanolamine or one heterocyclic amine containing six ring members and containing an oxygen atom and at least one nitrogen atom in the ring.

Preferably, the components (a), (b) and (c) are used in such a way that the aqueous emulsions contain 13.5 to 30 percent of component (a), 22.5 to 42 percent of component (b) and 45 to 50 percent of component (c), relative to the dry weight of the components (a), (b) and (c).

The aqueous emulsions are of thin to thick viscosity at a concentration of 30 to 50 percent.

When manufacturing the emulsions, an advantageous procedure is initially to introduce the component (c), which acts as the emulsifier, together with water. A melt of the components (a) and (b) is then added to this solution, while warming. On stirring vigorously, an emulsions is thereby produced, which can be diluted with water to the desired concentration. The emulsion is of low viscosity and colloidal. Additives such as protective colloids are not necessary.

For use, the emulsion is diluted with cold or warm water and a curing catalyst is added so that the resulting bath shows a solids content of 1 to 16 percent by weight.

As a curing catalyst for the methylol compound (a) and the emulsifier (c) it is possible to use the known acid or potentially acid aminoplast curing agents, for example ammonium salts of strong acids such as ammonium thiocyanate or chloride, zinc nitrate, zinc chloride, zinc fluoborate, magnesium chloride, and also acids such as hydrochloric acid, phosphoric acid or formic acid. Aluminum salts, for example aluminum chloride or especially aluminum sulphate, prove particularly advantageous. The curing catalyst is appropriately used in amounts of 1 to 5 percent relative to the solids content of the treatment baths.

The baths manufactured in this way by diluting the aqueous emulsion and by adding a curing catalyst serve to produce a wash-fast water-repellent finish on fiber materials, by treating the fiber material with these aqueous baths, which now show a solids content of 1 to 16 percent by weight. Thereafter the fiber material is dried and optionally subjected to a heat treatment at 100° to 200° C.

The treatment of the fiber material, for example cotton or fibers of regenerated cellulose, with the baths of the indicated composition can be carried out at room temperature or slightly elevated temperature, using the customary known devices, and appropriately on a padder. The weight increase is advantageously 60 to 100 percent.

Preferably, the fiber material impregnated in this way is dried and subjected to a heat treatment at 120° to 180° C. lasting 20 to 1 minute.

The finishes obtainable according to the present process impart good water repellency to the fiber materials, and are wash-fast. The fabrics and rollers remain clean during padding.

MANUFACTURING INSTRUCTIONS

1. Condensation products M (= component a).

M I: 252 g. (0.5 mol) of an 80 percent strength solution (viscosity index at 25° C.: 35 c.p.) in butanol of a low-viscosity hexamethylol-melamine-butyl-ether with about 2 butyl groups are condensed with 186 g. of a synthetic arachyl alcohol for 90 minutes at 120° to 125° C. in a vacuum of 30 mm. Hg pressure. 368 g. of a pale yellow (at 20° C.) petroleum jellylike mass are obtained, the mass giving a clear solution in warm paraffin and being insoluble in acetone. The original uncondensed reaction mixture is insoluble in paraffin but gives a clear solution in acetone. The reaction mixture shows a viscosity index of 890 c.p. at 60° C.

M II: An analogous condensation product can be manufactured in the same manner as described under M I, using 134 g. (0.5 mol) of commercial fatty alcohol, containing 63 percent of palmityl alcohol, 30 to 35 percent of stearyl alcohol and small amounts of lauryl and myristyl alcohol. 294 g. of a colorless waxy mass which gives a clear solution both in benzene and in paraffin on warming, are obtained.

M III: The condensation product M III is obtained in the same manner as described under M I, but using, instead of arachyl alcohol, the same amount of a fatty alcohol mixture of 44 percent of octadecyl alcohol, 66 percent of arachyl alcohol, 22 percent of behenyl alcohol and 8 percent of lignoceryl alcohol.

M IV: The condensation product M IV is obtained in the same manner as described under M I, but using, instead of arachyl alcohol, 2 mols of stearic acid methylamide per mol of hexamethylolmelamine-butyl-ether.

M V: 314 g. of hexamethylolmelamine (1 mol) are mixed with 504 g. of n-butanol (6 mols) and 0.5 g. of hydrochloric acid (37 percent strength) and heated to the reflux temperature for 30 minutes. Thereafter 538 g. of stearyl alcohol (2 mols) are added. After a further 30 minutes at the reflux temperature a clear solution is obtained. The solution is concentrated under a vacuum of 635 mm. Hg until a boiling point of 130° C. is reached.

M VI: The condensation product M VI is obtained in an analogous manner to that described under M I, from 1 mol of hexamethylolmelamine-pentamethyl-ether and 2 mols of stearyl alcohol.

2. Emulsifiers E (= component c).

E I: 206 g. of 36.5 percent strength formaldehyde, 230 g. of n-butanol and 9 g. of 24 percent strength ammonia are mixed and 60 g. of urea are introduced at 40° C. 40 g. of a mixture of n-butanol and water are then distilled off at 90° to 100° C. 1 g. of 85 percent strength phosphoric acid dissolved in 19 g. of n-butanol is now added and a mixture of n-butanol and water is distilled off in vacuo, with the water being separated off and the n-butanol being allowed to run back into the reaction mixture. The product can now be mixed with benzene in any desired proportions. It is neutralized by adding 2 g. of triethanolamine and thereafter concentrated by evaporation to 212 g. of residue.

The resulting resin is mixed with 180 g. of a polyethylene glycol having a molecular weight of 1,540 and heated to 120°–130° C., in the course of which a further 20 g. of n-butanol distill off. The product now dissolves in water. 36 g. of triethanolamine are added and the mixture is further heated to 120° C. for 1 hour. After cooling, the product is diluted with water 1:1, and a clear, viscous solution which can be diluted with water as desired, is obtained.

E II: 212 g. of the resin obtained as in E I are mixed with 25 g. of a polyethylene glycol of molecular weight 1,540 and heated to 145° C. in vacuo, in the course of which 25 g. of n-butanol distill off. As soon as the product gives a clear solution in water, 26 g. of morpholine are added and the mixture is heated to 120° C. for 1 hour. After cooling, it is diluted with water 1:1, and a clear, viscous product, which can be diluted with water as desired to give foaming solutions, is obtained.

E III: 1,000 g. of polyethylene glycol of molecular weight 4,000 are added in portions to 890 g. of hexamethylol-melaminetributyl-ether and the temperature is gradually raised to 95°–100° C. As soon as the two substances have mixed completely homogeneously, 5 g. of glacial acetic acid are added and the mixture is heated to 95°–100° C. while stirring until a sample of the reaction product, on being withdrawn, can be mixed with an equal amount of distilled water to give a clear solution, this being the case after 4 hours. 145 g. of triethanolamine are then added, the mixture is stirred and the temperature is raised to 120° C. After 2 hours the mixture is cooled to 60° C. and the reaction product is stirred with an equal amount of distilled water. 4,080 g. of a 50 percent strength slightly cloudy solution, which becomes completely clear on addition of a little acetic acid, are obtained. The pH is 8.1 to 8.2.

E IV: 79 g. (0.2 mol) of hexamethylolmelamine-pentamethylether, 37.2 g. (0.2 mol) of commercial lauryl alcohol and 100 g. of polyethylene glycol of molecular weight 4,000 are fused together at 85° to 90° C. and after adding 0.5 g. of glacial acetic acid the mixture is kept at 100° to 102° C. for 4 hours. A sample is here still soluble in water to give an opalescent colloidal solution. 15 g. of triethanolamine are now added and the mixture is warmed to 120° C. for 2 hours. 232 g. of reaction product are obtained and cooled to 60° C., and 232 g. of water at 60° C. are slowly added dropwise. A 50 percent strength white, colloidal, viscous solution is obtained. The 10 percent strength dilution shows a pH value of 7.8.

E V: If the same procedure as described under E III is followed, but with the difference that the triethanolamine is replaced by an equivalent amount (145 g.) of N-2-hydroxyethylmorpholine, a similar product as E III, having the same emulsifying properties, is obtained.

E VI: The procedure described under E III is followed, but with the difference that the triethanolamine is replaced by an equivalent amount (61 g.) of ethanolamine. A similar product as E III is obtained.

EXAMPLE 1

Manufacturing instruction for an emulsion

The manufacture of 100 g. of an emulsion is described, for which the data from the table which follows have to be inserted. e g of emulsifier E (= component c) and 14.6 g. of water are initially introduced into a vessel which can be heated and has a propeller stirrer of infinitely variable speed of rotation. A melt, at 95° to 97° C., of m g of melamine resin M (= component a) and p g of waxy substance P (= component b) is slowly poured into this initially introduced material which is at 95° C., while the speed of revolution of the propeller stirrer is continuously increased. Thereafter the resulting emulsion is vigorously stirred for 2 minutes. It is then diluted with 27.2 g. of cold water while stirring slowly and cooled with water to room temperature. 100 g. of a colloidal emulsion of low viscosity, which can be diluted with cold or warm water and shows the properties indicated in Example 2, are obtained.

The aqueous emulsions 1.1 to 1.18 have the following compositions:

padder, with the uptake of impregnating liquid being 70 percent. After drying at 80° C., curing is carried out for 5 minutes at 150° C. A material with a water-repellent finish is obtained.

The water-repellent properties of the woven fabrics are determined by means of the spray test, on the basis of the water absorbency after brief sprinkling:

25 cm. long, weighed fabric samples are held at both ends with 2 clips weighing 85 g. and laid over two rods. The fabric samples are thereafter sprinkled with 500 ml. of water and freed of adhering drops, and the moist sample is weighed. The weight increase, as a measure of the effect of rendering the material hydrophobic, is expressed as a percentage of the dry fabric.

TABLE II

| Emulsion | | | % water absorption | |
|---|---|---|---|---|
| No. | g./l. in the bath | | unwashed fabric | fabric washed at the boil in a washing machine |
| 1.1 | 90 | | 4 | 5 |
| 1.2 | 90 | | 2 | 4 |
| 1.3 | 90 | | 3 | 4 |
| 1.4 | 90 | | 3 | 6 |
| 1.5 | 90 | | 3 | 5 |
| 1.6 | 90 | | 2 | 4 |
| 1.7 | 90 | | 2 | 4 |
| 1.8 | 90 | | 2 | 5 |
| 1.9 | 90 | | 3 | 4 |
| 1.10 | 90 | | 2 | 6 |
| 1.11 | 90 | | 2 | 4 |

EXAMPLE 3

Viscose fabrics are finished with emulsions No. 1.6 to 1.18 in the same way as described in Example 3. The effects of rendering the fabrics hydrophobic, achieved thereby, are given in Table III.

TABLE I

| Components | G. | Emulsion number | | | | | | | | | | | | | | | | | |
|---|---|---|---|---|---|---|---|---|---|---|---|---|---|---|---|---|---|---|---|
| | | 1.1 | 1.2 | 1.3 | 1.4 | 1.5 | 1.6 | 1.7 | 1.8 | 1.9 | 1.10 | 1.11 | 1.12 | 1.13 | 1.14 | 1.15 | 1.16 | 1.17 | 1.18 |
| (a): | | | | | | | | | | | | | | | | | | | |
| M I | m | 10.9 | 7.3 | | 7.3 | 7.3 | 7.3 | 7.3 | 7.3 | 7.3 | 7.3 | | | | | | | | |
| M II | m | | | 10.9 | | | | | | | | | | | | | | | |
| M III | m | | | | | | | | | | | | 7.3 | | | | | | |
| M IV | m | | | | | | | | | | | | | 6.0 | 7.2 | | | | |
| M V | m | | | | | | | | | | | | | | | 7.2 | 4.4 | 19.7 | |
| M VI | | | | | | | | | | | | | | | | | | | 7.3 |
| (b): | | | | | | | | | | | | | | | | | | | |
| P I | p | | | | | | | | 14.5 | | | | | | | | | | |
| P II | p | 10.9 | 14.5 | 10.9 | 14.5 | 14.5 | 14.5 | 14.5 | | 14.5 | | 14.6 | 12 | 7.2 | 7.2 | 17.5 | 2.2 | 14.6 | |
| P III | p | | | | | | | | | | 14.5 | | | | | | | | |
| P IV | p | | | | | | | | | | | 14.5 | | | | | | | |
| P V | p | | | | | | | | | | | | | 3.6 | 3.6 | | | | |
| (c): | | | | | | | | | | | | | | | | | | | |
| E I | e | | | | | 36.3 | | | | | | | | | | | | | |
| E II | e | | | | 36.3 | | | | | | | | | | | | | | |
| E III | e | 36.3 | 36.3 | 36.3 | | | 36.3 | 36.3 | 363. | 36.3 | | 30 | 30 | | 30 | 36.3 | 36.3 | | 36.3 |
| E IV | e | | | | 36.3 | | | | | | | | | | | | | | |
| E V | e | | | | | | | | | | 36.3 | | | | | | | | |
| E VI | e | | | | | | | | | | | 36.3 | | | | | | | |

The waxy substance P [= component (b)] of Table I is one of the following products:

P I: paraffin of melting point 50° C.
P II: paraffin of melting point 60° C.
P III: paraffin of melting point 70° C.
P IV: 1:1 mixture of paraffin of melting point 60° C. and beeswax of melting point 62° C.
P V: fusible polyethylene with a molecular weight of 1,000 to 3,000, an acid number of 15 and a specific gravity of 0.93.

EXAMPLE 2

90 g. of an emulsion manufactured according to Example 1 are diluted with water at room temperature, with the addition of 40 percent strength acetic acid until a pH-value of 5 is reached, in such a way that after adding 20 g. of a 20 percent strength aluminum sulphate solution an impregnating bath of 1 litre is obtained. This is introduced into the trough of a triple-roll padder. A cotton gaberdine strip passes through the

TABLE III

| Emulsion | | % water absorption | |
|---|---|---|---|
| No. | g./l. in the bath | unwashed fabric | fabric washed at 60° C. in a washing machine |
| 1.6 | 90 | 2 | 5 |
| 1.7 | 90 | 2 | 4 |
| 1.8 | 90 | 2 | 6 |
| 1.9 | 90 | 2 | 4 |
| 1.10 | 90 | 2 | 4 |
| 1.11 | 90 | 2 | 7 |
| 1.12 | 163 | 2 | 6 |
| 1.13 | 163 | 2 | 8 |
| 1.14 | 163 | 3 | 7 |
| 1.15 | 163 | 2 | 9 |
| 1.16 | 163 | 2 | 8 |
| 1.17 | 163 | 2 | 12 |
| 1.18 | 163 | 4 | 7 |

EXAMPLE 4

The procedure described in Example 2 is followed, using 109 g. of the emulsion No. 1.2. Instead of the 20 percent strength aluminum sulphate solution, the following are employed per liter of impregnating bath:

| Bath No. | Catalyst | g./l. |
|---|---|---|
| 4.1 | $Al_2SO_4 \cdot 18H_2O$ | 3 |
| 4.2 | $AlCl_3 \cdot 6H_2O$ | 2 |
| 4.3 | $ZnCl_2$ | 5 |
| 4.4 | $MgCl_2 \cdot 6H_2O$ | 15 |
| 4.5 | $H_3PO_4$, 85% strength | 10 |

Equally good effects of rendering the fabric hydrophobic as those indicated in Example 2 are achieved.

I claim:

1. An aqueous emulsion with a total solids content of 10 to 15 percent by weight, which contains the following, relative to the dry weight of the components (a), (b) and (c): (a) 9 to 54 percent of a methylolaminotriazine etherified with higher fatty alcohols which contain at least 14 carbon atoms, (b) 4.5 to 48 percent of a hydrophobic, waxy, substance soluble in the component (a), and (c) 40 to 55 percent of a hydrophilic, water-insoluble reaction product of (c.1) an aminoplast precondensate containing methyl groups or its ether with an alkanol with at most three carbon atoms, (c.2) a monohydroxy compound containing at least four carbon atoms, (c.3) a polyethylene glycol having an average molecular weight of 600 to 20,000, and (c.4) an oxygen-dontaining aliphatic or heterocyclic amine, the quantity ratio of component (c.3) to the remaining components (c.1), (c.2) and (c.4) of component (c) being at least 1:9 and at most 9:11.

2. An aqueous emulsion according to claim 1 which contains, as component (a), a methylolmelamine which is etherified with alkanols which each contain 14 to 24 carbon atoms.

3. An aqueous emulsion according to claim 2, which is further etherified with alkanols which contain at most four carbon atoms.

4. An aqueous emulsion according to claim 1 which contains, as component (a), an ether obtainable from methylolmelamine-butyl-ether and stearyl, arachyl or behenyl alcohol.

5. An aqueous emulsion according to claim 1 which contains paraffin as component (b).

6. An aqueous emulsion according to claim 1 which contains, as component (c), a reaction product of (c.1) a methylolurea or methylolmelamine, (c.2) an alkanol with four to 18 carbon atoms, (c.3) polyethylene glycol with an average molecular weight of 1,000 to 5,000 and (c.4) an alkanolamine or a heterocyclic amine containing six ring members, which contains an oxygen atom and at least one basic nitrogen atom in the ring.

7. An aqueous emulsion according to claim 1 characterized in that n-butanol is used as component (c.2) in the reaction product (c).

8. An aqueous emulsion according to claim 1 characterized in that an ethanolamine is used as component (c.4) in the reaction product (c).

* * * * *